Patented Apr. 9, 1940

2,196,576

UNITED STATES PATENT OFFICE 2,196,576

GLYCOL ETHER

Gerald H. Coleman, Lindley E. Mills, and Garnett V. Moore, Midland, Mich., assignors to The Dow Chemical Company, Midland, Mich., a corporation of Michigan No Drawing. Application December 16, 1938, Serial No. 246,134

6 Claims. (Cl. 260—613)

This invention concerns certain new glycol ethers and a method of making same.

In our co-pending application Serial No. 90,380, filed July 13, 1936, of which the present application is a continuation-in-part, we have disclosed a class of new glycol ethers having the general formula,

[diphenyl]—O—CH(R)—C$_n$H$_{2n}$—Y wherein the xenyl, i. e. diphenyl radical, may contain neutral substituents such as halogen or alkyl groups, R represents hydrogen or an alkyl group and Y represents a halogen or xenoxy radical attached to a primary or secondary carbon atom, which xenoxy radical may also contain neutral substituents. In the co-pending application such ethers are referred to generically as "xenyl-glycol ethers".

In said co-pending application Serial No. 90,380 a method of preparing the xenyl glycol ethers is given and it is shown that two types of such ethers, viz., a monoxenyl ether of a chloro aliphatic hydrocarbon and a dixenyl ether of a glycol are often obtained conjointly. The products claimed in the co-pending application are the mono-xenyl ethers of the halo-aliphatic hydrocarbons.

The products claimed in the present application are the dixenyl ethers of glycols. For convenience the ethers having the general formula given above will, as in said co-pending application, be referred to generically as "xenyl glycol ethers", and the dixenyl ethers of glycols herein claimed will be referred to as "dixenyl glycol ethers".

The dixenyl glycol ethers have the general formula,

[diphenyl]—O—CH(R)—C$_n$H$_{2n}$—O—[diphenyl]

wherein R represents hydrogen or an alkyl group and the xenyl radicals may contain neutral substituents such as halogen or alkyl groups and $n$ is an integer. They are useful as plasticizing agents in lacquers and varnishes and in nitrocellulose, cellulose acetate, and cellulose ether compositions. They may also be employed as chemical agents for the preparation of a variety of organic compounds.

The xenyl-glycol ethers are prepared by heating a dihalo-aliphatic hydrocarbon to a reaction temperature with a metal xenate (or a mixture of a xenol and a metal hydroxide) in the presence or absence of a reaction medium, such as water, alcohol, benzene, etc. The dihalo-aliphatic hydrocarbon reactant is a saturated compound containing chlorine and/or bromine as the halogen substituents, the latter being attached to two different primary or secondary carbon atoms. Among the various dihalo-aliphatic hydrocarbons which may be employed are ethylene chloride, ethylene bromide, 1-chloro-2-bromo-ethane, propylene chloride, 1,3-dichloro-propane, 1-chloro-3-bromo-propane, 1,3-dichloro-isobutane, 1,3-dibromo-butane, 1,4-dichloro-butane, a normal-butylene chloride, a normal-hexylene chloride, etc. The metal hydroxide or xenate is preferably an alkali metal compound, e. g. a sodium or potassium compound, although corresponding compounds of other metals, e. g. calcium or barium, can be used.

The reactants may be employed in any desired proportions, but for sake of economy and to avoid side reactions which may occur, especially when water or alcohol is used as a reaction medium, the hydroxide is preferably employed in a proportion not greatly exceeding that required to form a salt of the xenol. When a mono-xenyl ether of a halo-aliphatic hydrocarbon is the product desired, one molecular equivalent or more of the dihalo-aliphatic hydrocarbon reactant is preferably employed per mole of xenol. When a dixenyl ether of a glycol is desired, approximately two moles of a xenol, or an equivalent amount of a metal xenate, is preferably used per mole of the dihalo-aliphatic hydrocarbon reactant.

The reaction usually occurs smoothly at temperatures between 80° and 125° C., but may be carried out at considerably higher temperatures, e. g. 200° C., if desired. It may be effected by heating the reaction mixture under reflux at atmospheric pressure or by heating it under pressure in a bomb or autoclave. The time of heating required to complete the reaction varies from a few minutes to several hours, depending upon the particular reactants employed, the temperature at which the reaction is carried out, etc.

The ether product is separated by conventional procedure, e. g. by distillation of the reacted mixture.

The following examples describe a number of ways in which the principle of the invention has been applied, but are not to be construed as limiting the invention.

*Example 1*

A mixture of 510 grams (3 mols) of ortho-xenol, 564 grams (3 mols) of ethylene bromide, 123.2 grams (3.08 mols) of sodium hydroxide, and 751 grams of water was heated under reflux at temperatures varying from 86° to 100° C. for 1.5 hours. The mixture was then cooled, neutralized with sulphuric acid, and the organic layer thereof was separated and distilled. There were obtained 302 grams (1.74 mols) of unreacted ortho-xenol, 296 grams (1.07 mols) of 1-bromo-2-(ortho-xenoxy-) ethane, and 25.6 grams (0.07 mol) of 1,2-di-(ortho-xenoxy-) ethane. The yields of 1-bromo-2-(ortho-xenoxy-) ethane and 1,2-di-(ortho-xenoxy-) ethane, based on the ortho-xenol reacted, were 84.7 per cent and 10.6 per cent of theoretical, respectively. The 1-bromo-2-(ortho-xenoxy-) ethane is a white crystalline compound melting at 66.5° C., boiling at approximately 170° to 175° C. under 5 millimeters pressure, and having the formula,

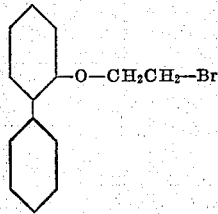

The 1,2-di-(ortho-xenoxy-) ethane product is a white crystalline compound melting at 100.5° C., boiling at about 268° C. under 5 millimeters pressure, and having the formula,

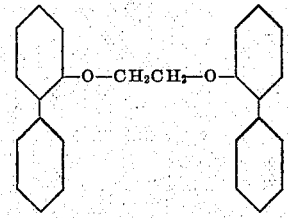

*Example 2*

A mixture of 510 grams (3 mols) of ortho-xenol, 148.5 grams (1.5 mols) of ethylene chloride, 120 grams (3 mols) of sodium hydroxide, and 450 cubic centimeters of benzene was heated to 150° C. in a rotating bomb for 4 hours. The bomb was then cooled and the charge removed. The mixture was acidified by treatment with a dilute sulphuric acid solution, washed thoroughly with water and distilled. There were obtained 253 grams (1.49 mols) of unreacted ortho-xenol, 56.6 grams (0.243 mol) of 1-chloro-2-(ortho-xenoxy-) ethane and 197.5 grams (0.54 mol) of 1,2-di-(ortho-xenoxy-) ethane. The yields of 1-chloro-2-(ortho-xenoxy-) ethane and 1,2-di-(ortho-xenoxy-) ethane were 16.2 per cent and 76 per cent of theoretical, respectively, based on the ortho-xenol reacted.

*Example 3*

A mixture of 510 grams (3 mols) of ortho-xenol, 594 grams (6 mols) of ethylene chloride, and 240 grams (6 mols) of sodium hydroxide was heated for about 15 minutes in a rotating bomb at temperatures which rose spontaneously from about 150° C. to 205° C. during said period. The bomb was then cooled, the charge removed, and the products separated as in Example 2. There were obtained, 128 grams (0.75 mol) of unreacted ortho-xenol, 312 grams (1.34 mols) of 1-chloro-2-(ortho-xenoxy-) ethane, and 126 grams (0.34 mol) of 1,2-di-(ortho-xenoxy-) ethane. The yields of 1-chloro-2-(ortho-xenoxy-) ethane and 1,2-di-(ortho-xenoxy-) ethane were 59.5 per cent and 30.5 per cent of theoretical, respectively, based on the ortho-xenol reacted.

*Example 4*

A mixture of 510 grams (3 mols) of meta-xenol, 594 grams (6 mols) of ethylene chloride, 123.2 grams (3.08 mols) of sodium hydroxide, and 180 grams of water was heated under pressure in a rotating bomb at 100° C. for 10 hours. The bomb was then cooled and the charge removed and neutralized with sulphuric acid after which the organic layer of the mixture was separated and distilled. By the distillation there were separated 153 grams (0.90 mol) of unreacted meta-xenol and 288 grams (1.67 mols) of 1-chloro-2-(meta-xenoxy-) ethane, the yield of the latter being 79.3 per cent of theoretical based on the meta-xenol reacted. The 1-chloro-2-(meta-xenoxy-) ethane is a viscous liquid boiling at approximately 179°–181° C. under 5 millimeters pressure and having the formula,

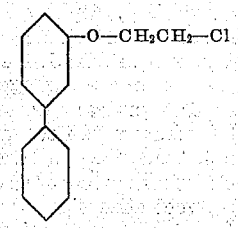

High boiling material, remaining after the above distillation, was fractionally crystallized from carbon tetrachloride, whereby 62.2 grams (0.17 mol) of 1,2-di-(meta-xenoxy-) ethane, was separated as white crystals melting at 128° to 129° C., the yield thereof being 15.9 per cent of theoretical based on the neta-xenol reacted. Said product has the formula,

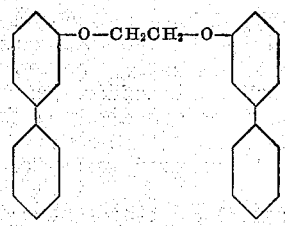

*Example 5*

A mixture of 170 grams (1 mol) of para-xenol, 99 grams (1 mol) of ethylene chloride, 41.2 grams (1.03 mols) of sodium hydroxide, and 252 grams of water was heated under reflux at temperatures varying from 73° to 91° C. for 24 hours. The reaction products were then separated as in Example 2. There were obtained, 78 grams (0.335 mol) of 1-chloro-2-(para-xenoxy-) ethane as a white crystalline compound melting at 103° C. and boiling at approximately 163° to 165° C. under 3 millimeters pressure, and 7.3 grams (0.02 mol) of 1,2-di-(para-xenoxy-) ethane as a white crystalline compound melting at 219° C. The 1-chloro-2-(para-xenoxy-) ethane and 1,2-di-(para-xenoxy-) ethane have the following respective formulas,

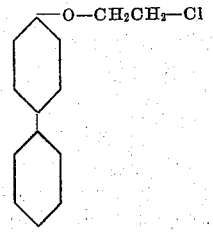

and

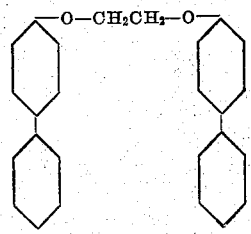

Example 6

A mixture of 510 grams (3 mols) of ortho-xenol, 381 grams (3 mols) of 1,3-dichloro-isobutane, 123.2 grams (3.08 mols) of sodium hydroxide and 750 grams of water was heated at temperatures between 93° and 101° C. under reflux for 10 hours, after which the products were separated as in Example 2. There were obtained, 246 grams (1.45 mols) of unreacted ortho-xenol, 252 grams (0.95 mol) of 1-chloro-3-(ortho-xenoxy-) isobutane and 102.5 grams (0.26 mol) of 1,3-di-(ortho-xenoxy-) isobutane. The 1-chloro-3-(ortho-xenoxy-) isobutane is a viscous liquid boiling at approximately 170° to 173° C. under 5 millimeters pressure and having the formula,

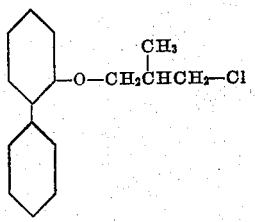

The 1,3-di-(ortho-xenoxy-) isobutane is a more viscous liquid boiling at approximately 280° to 285° C. under 5 millimeters pressure and having the formula,

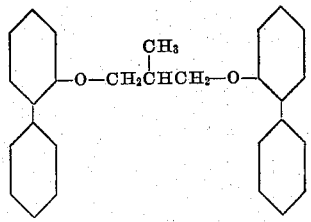

Example 7

A mixture of 200 grams (0.89 mol) of 5-secondary-butyl ortho-xenol (i. e. 2-hydroxy-5-secondary-butyl diphenyl), 83.6 grams (0.445 mol) of ethylene bromide, 35.6 grams (0.89 mol) of sodium hydroxide, 37.5 grams of water, and 270 cubic centimeters of methyl alcohol was heated under reflux at temperatures which were gradually increased from 57° to 72° C. for 5 hours. The mixture was then acidified by treatment with a dilute sulphuric acid solution, washed thoroughly with water, and the washings were analyzed to determine the inorganic bromide content thereof. By this analysis it was ascertained that 58 per cent of the ethylene bromide employed had been reacted. The product remaining after the washing operation was distilled whereby 30 grams of di-(5-secondary-butyl ortho-xenoxy-) ethane distilling at temperatures between 277° and 285° C. at 3 millimeters pressure was collected. Said product is an extremely viscous yellow-brown liquid of specific gravity 1.043 at 50°/4° C., which might be regarded as a soft resin when at room temperature. It has probably the formula,

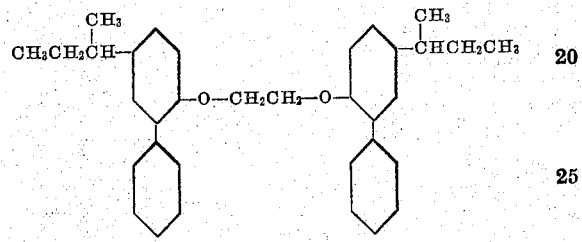

Example 8

A mixture of 205 grams (1 mol) of 3-chloro-para-xenol (i. e. 3-chloro-4-hydroxy-diphenyl), 94 grams (0.5 mol) of ethylene bromide, 40 grams (1 mol) of sodium hydroxide, and 200 grams of water was heated under reflux at temperatures between 89° and 105° C. for 2 hours, after which the mixture was cooled and washed with water. The washings were analyzed for inorganic bromides, whereby it was found that 77.5 per cent of the ethylene bromide employed had been reacted. The mixture remaining after the washing treatment was heated to boiling with alcohol, cooled and then filtered to remove the product, which is substantially insoluble in alcohol. There was obtained 87 grams (0.2 mol) of di-(3-chloro-para-xenoxy-) ethane as a white solid having a melting point of approximately 222° to 223° C. The product is only slightly soluble in boiling benzene. It has probably the formula,

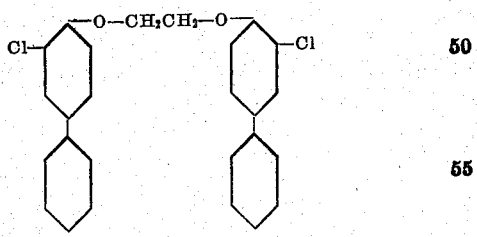

Example 9

A mixture of 452 grams (2 mols) of 5-tertiary-butyl-ortho-xenol (i. e. 2-hydroxy-5-tertiary-butyl diphenyl), 80 grams (2 mols) of sodium hydroxide, 188 grams (1 mol) of ethylene bromide, 84 grams of water, and 600 cubic centimeters of methyl alcohol was heated under reflux at temperatures between 67° and 73° C. for 16 hours, after which the methyl alcohol was distilled from the mixture. The residual material was treated with water, rendered slightly acid by the addition of dilute aqueous sulphuric acid, and was washed from the reactor. The mixture was then extracted with 600 cubic centimeters of benzene and the extract was washed thoroughly with water and distilled. There was collected 125 grams of di-(5-tertiary-butyl-ortho-xenoxy-) ethane as the fraction distilling at temperatures between 285° and 290° C. at 4 millimeters pressure. The product was, at room temperature, a clear, brittle, light amber resin. It has probably the formula,

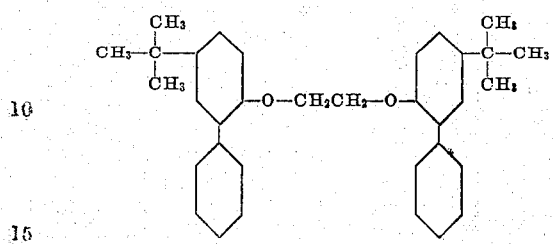

Still other dixenyl glycol ethers may be prepared according to the procedure hereinbefore described by using other substituted xenols, e. g. 2-hydroxy-5-methyl-xenene, 2-hydroxy-4-ethyl-6-chloro-xenene, 2,2'-dichloro-4-hydroxy-xenene, etc., and other dihalo-aliphatic hydrocarbons, e. g. a normal butylene chloride or bromide, a normal amyl chloride or bromide, etc., as reactants. In so far as we are aware, any xenol containing no strongly acidic or basic radical may be reacted with any saturated dihalo-aliphatic hydrocarbon containing chlorine and/or bromine as the halogen substituents, and having the halogen atoms situated on two different primary or secondary carbon atoms to form the corresponding dixenyl glycol ether.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. A di-xenyl glycol ether.
2. A compound having the general formula,

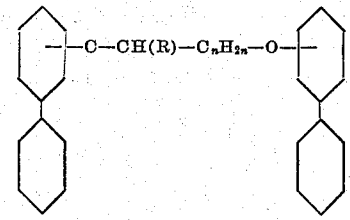

wherein R is a substituent of the group consisting of hydrogen and alkyl radicals, $n$ is an integer, and each xenoxy radical is attached to a carbon atom (selected from the class consisting of primary and secondary carbon atoms) of the aliphatic radical.

3. 1,2-di-(ortho-xenoxy-) ethane.
4. 1,2-di-(meta-xenoxy-) ethane.
5. 1,2-di-(para-xenoxy-) ethane.
6. In a method of making dixenyl glycol ether, the step which consists in heating an alkali metal xenate to a reaction temperature with approximately one-half of its molecular equivalent of a saturated dihalo-aliphatic hydrocarbon having the general formula, X—CH(R)$C_nH_{2n}$—Z wherein R is a substituent of the group consisting of hydrogen and alkyl radicals, $n$ is an integer, X and Z represent halogen substituents selected from the class consisting of chlorine and bromine, and the halogen substituent Z is attached to a carbon atom of the class consisting of primary and secondary carbon atoms.

GERALD H. COLEMAN.
LINDLEY E. MILLS.
GARNETT V. MOORE.